United States Patent [19]

Park

[11] Patent Number: 5,750,269

[45] Date of Patent: May 12, 1998

[54] REMOVABLE COATING COMPOSITION AND PROCESS FOR PROTECTING SURFACES

[75] Inventor: Vernon Kee Park, Longview, Tex.

[73] Assignee: Eastman Chemical Company, Kingsport, Tenn.

[21] Appl. No.: 579,682

[22] Filed: Dec. 28, 1995

[51] Int. Cl.$^6$ .......................... B32B 27/00; B32B 27/30; B32B 27/32; C08K 5/01

[52] U.S. Cl. .................. 428/484; 106/270; 208/21; 427/154; 427/416; 524/275; 524/276; 524/474; 524/475; 524/476; 524/481; 524/487; 524/491; 524/848; 428/522

[58] Field of Search .................. 428/40.1, 40.5, 428/41.5, 41.7, 352, 484, 500, 522; 427/154, 155, 156, 385.5, 416, 407; 106/14.34, 14.35, 270, 271; 524/275, 276, 277, 474, 475, 476, 477, 489, 481, 487, 491, 848; 526/317.1, 318.4, 319, 329.7, 329.5; 206/21, 20

[56] References Cited

U.S. PATENT DOCUMENTS

| | | | |
|---|---|---|---|
| 4,241,141 | 12/1980 | Dill | 428/500 |
| 4,349,586 | 9/1982 | Sejournant | 427/154 |
| 5,049,186 | 9/1991 | Kawabata | 106/2 |
| 5,262,464 | 11/1993 | Koevenig et al. | 524/413 |
| 5,387,434 | 2/1995 | Black | 427/154 |
| 5,418,006 | 5/1995 | Roth et al. | 427/154 |
| 5,428,095 | 6/1995 | Swidler | 524/389 |
| 5,453,459 | 9/1995 | Roberts | 524/123 |

FOREIGN PATENT DOCUMENTS

WO90/08165  7/1990  WIPO.

OTHER PUBLICATIONS

Database WPI, Section Ch, Week 8514, Derwent Publilcations Ltd., London, GB; Class A82, AN 85–084122 XP002030704 & JP 60 035 063 A (Nissan Motor Co Ltd), 22 Feb. 1985, see abstract.

*Primary Examiner*—Vivian Chen
*Attorney, Agent, or Firm*—Mark A. Montgomery; Andrew B. Griffis; Harry J. Gwinnell

[57] ABSTRACT

A removable coating composition comprises oxidized polyethylene wax, paraffin wax, and acrylic copolymer. A process of protecting surfaces comprises applying the coating composition in an aqueous emulsion to a surface and drying. The resulting coated surface is protected such that when graffiti is applied to the coated surface, the graffiti and coating are easily removed with hot water or steam.

12 Claims, No Drawings

REMOVABLE COATING COMPOSITION AND PROCESS FOR PROTECTING SURFACES

FIELD OF THE INVENTION

The present invention relates to a removable coating composition useful for protecting concrete, granite, marble, painted surfaces, etc., from coatings, such as graffiti. The present invention more particularly relates to a composition and a process of using the composition to protect surfaces and provide a means for the easy removal of graffiti markings such as paint.

BACKGROUND OF THE INVENTION

Graffiti is a form of vandalism to buildings, public transportation, highway concrete abutments and substantially any vertical or other visible surfaces. It is a problem for interior and exterior surfaces. Interior graffiti which includes interior walls in schools, buses, subways, public buildings, rest rooms, etc. is applied primarily using flexible tip permanent marking pens. Exterior graffiti which includes concrete abutments, bridges, walls of buildings, subways, etc. is applied usually with canned spray paints that are typically oil based.

A method to counteract graffiti problems is to apply a protective coating onto a surface to protect it and which acts as a sacrificial coating that both prevents the transmission of the graffiti through the coating and allows removal of the graffiti. U.S. Pat. No. 4,241,141 discloses a removable anti-graffiti coating. However, this coating requires cleaning solutions to remove it. U.S. Pat. No. 5,387,434 discloses another removable anti-graffiti coating, however, this coating requires power washing at a pressure of greater than 250 psi to remove the coating.

It would be very desirable to be able to inexpensively protect surfaces from graffiti and to be able to easily remove these protective coatings in an environmentally friendly manner, such as with hot water or steam.

SUMMARY OF THE INVENTION

The coating composition according to the present invention comprises a) about 10 to 50 weight percent of an oxidized polyolefin wax, b) about 10 to 80 weight percent paraffin wax, and c) about 10 to 80 weight percent acrylic copolymer based on dry material.

An aqueous emulsion composition according to the present invention further comprises water such that the solids a), b), and c), are in an aqueous emulsion at a total solids concentration of about 5 to 50 weight percent in water.

A process of applying the coating according to the present invention comprises applying the above emulsion composition to a surface and allowing the composition to dry to remove water. By applying this composition to a surface the surface is protected from graffiti since the composition and graffiti are easily removed with hot water.

DETAILED DESCRIPTION OF THE INVENTION

The applicant has unexpectedly discovered an improved easily removable coating composition that can be coated on any surface that is subject to the application of a coating that is not intended to be permanent (e.g. graffiti). The composition according to the present invention can be applied in the form of an emulsion by painting or spraying onto a surface such as concrete, etc. and then dried to form a protective coating for the substrate. Once a temporary or undesirable coating is applied, the layer of the inventive composition can be easily removed along with the top coating simply by the application of hot water or steam, such as in the form of a spray or jet.

The coating composition according to the present invention comprises a) about 10 to 50 weight percent of an oxidized polyolefin wax, b) about 10 to 80 weight percent paraffin wax, and c) about 10 to 80 weight percent acrylic copolymer based on dry material.

The oxidized polyolefin wax of a) is in a concentration of about 10 to 50 weight percent, preferably about 15 to 30 with a weight percent of about 20 to 25 being most preferred. The oxidized polyolefin wax according to the present invention provides stability to the resulting emulsion and the dried coating. Thus, amounts much below about 10 weight percent are too little to provide this stability and the coating can be too easily removed simply by weather.

The oxidized polyolefin wax of a) is preferably a low density polyethylene wax having a density between 0.92 and 0.96 g/cc. The preferred polyethylene wax is a homopolymer. However, minor amounts up to 10 weight percent of another alpha-olefin can also be used, with less than 2 weight percent being more preferred. The preferred oxidized polyethylene wax is a low molecular weight polyethylene wax having an acid number of about 10 to 40, a Brookfield Thermosel Viscosity of about 50 to 2,500 cP at 125° C. and a Ring and Ball Softening Point (RBSP) of 90° to 130° C. The oxidized low molecular weight polyethylene wax has an acid number of about 10 to 40, preferably about 10 to 30, more preferably about 15 to 20. At acid numbers much below 10 the wax cannot be emulsified to a high quality emulsion. However, at acid numbers much above 40 the stability of the emulsion and coating begin to be a problem.

The oxidized low molecular weight polyethylene wax has a low molecular weight, as evidenced by the Brookfield Thermosel Viscosity being between 50 and 2,500 cP at 125° C. However, this viscosity is preferably about 100 to 2,000, with a viscosity of about 150 to 400 cP at 125° C. being most preferred. If the oxidized low molecular weight polyethylene wax has a Brookfield Thermosel Viscosity much below about 50 cP, the material becomes significantly more difficult to handle as it is too runny. Whereas, much above 2,500 cP the flow characteristics begin to be undesirable as the material becomes too thick.

The preferred oxidized low molecular weight polyethylene wax according to the present invention has an RBSP of 90° to 130° C., preferably 90° to 120° C. with a RBSP of about 90° to 110° C. being most preferred. If the oxidized low molecular weight polyethylene wax has an RBSP much below 90 it is too soft to be very desirable; whereas, having an RBSP of greater than 120° C. requires the preparation of the emulsion under pressure.

The composition according to the present invention employs about 10 to 80 weight percent of a paraffin wax. This paraffin wax preferably has a RBSP of about 30° to 75° C., more preferably about 45° to 60° C. If the RBSP of the paraffin wax gets much below 30° C., the material is generally too soft for ambient conditions; whereas, a paraffin wax with a RBSP much above 75° C. is not commercially available at the present time.

The composition according to the present invention contains about 10 to 80 weight percent of the paraffin wax of b), preferably about 30 to 60 weight percent with a weight percent paraffin wax of about 35 to 50 being most preferred. When amounts of the paraffin wax in the composition are much below 10 weight percent the resulting coating has a RBSP that is too high. When the RBSP of the coating composition is too high then the coating is not easily removed from the substrate when using hot water. However, when amounts of the paraffin wax are much above 80 weight percent, the emulsion is not stable and it will not adhere to the substrate when applied.

Additionally, it is preferred that the weight ratio of oxidized polyethylene wax to paraffix wax be within 30/70 to 70/30.

The composition according to the present invention contains an acrylic copolymer c) at a concentration of about 10 to 80 weight percent, preferably about 25 to 60 weight percent with a weight percent of acrylic polymer of about 30 to 50 being most preferred. At concentrations of acrylic copolymer much below 10 weight percent the coating composition will not adhere to the substrate whereas at amounts much over 80 weight percent, the coating composition (when dried) sticks too strongly to the substrate and is not easily removed with hot water. The acrylic copolymer c) is preferably a thermoplastic acrylic copolymer containing about 15 to 75 weight percent hard monomer, 20 to 70 weight percent soft monomer, and 0 to 30 weight percent acid monomer. Acrylic copolymers of the present type are disclosed in U.S. Pat. No. 5,262,464 and generally comprise:

i) about 1 to about 30 percent by weight of an ethylenically unsaturated carboxylic acid or anhydride or mixtures thereof ii) about 20 to about 90 percent other ethylenically unsaturated monomers iii) about 0 to 50 percent by weight of an ethylenically unsaturated monomer with a functional group other than the carboxylic acid group or the carboxylic anhydride group.

Preferred acrylic copolymers or polyacrylate resins comprise:

i) about 1 to about 20 percent by weight of an ethylenically unsaturated carboxylic acid or anhydride or mixtures thereof ii) about 40 to about 85 percent other ethylenically unsaturated monomers iii) about 2 to 40 percent by weight of an ethylenically unsaturated monomer with a functional group other than the carboxylic acid group or the carboxylic anhydride group.

Most preferred polyacrylate resins comprise:

i) about 3 to about 15 percent by weight of an ethylenically unsaturated carboxylic acid or anhydride or mixtures thereof ii) about 55 to about 85 percent other ethylenically unsaturated monomers iii) about 5 to 30 percent by weight of an ethylenically unsaturated monomer with a functional group other than the carboxylic acid group or the carboxylic anhydride group.

Suitable ethylenically unsaturated carboxylic acid monomers (i) are acrylic acid, methacrylic acid, acryloxypropionic acid or polyacrylic acid mixtures, methacrylic acid dimer or polymethacrylic acid mixtures, crotonic acid, fumaric acid, maleic acid or maleic anhydride, itaconic acid or itaconic anhydride, and alkylesters of maleic, itaconic or fumaric acids.

The other ethylenically unsaturated monomers (ii) can be chosen from acrylic or methacrylic alkyl ester derived from alcohols having 1 to about 20 carbon atoms, or vinyl monomers. The expression (meth)acrylate with parenthesis as used herein includes methacrylate and acrylate. Suitable examples are methyl(meth)-acrylate, ethyl (meth)acrylate, propyl(meth)acrylate, n-butyl(meth)acrylate, isobutyl(meth) acrylate, t-butyl(meth)acrylate and 2-ethylhexyl(meth) acrylate, maleic acid or fumaric acid dialkylesters in which the alkyl groups have 1 to 20 carbon atoms, vinylaromatics such as styrene, a-methylstyrene, vinyltoluene, t-butylstyrene, halogenated vinylbenzenes such as chlorostyrene, and other monomers like vinylchloride, (meth)-acrylamide and (meth)acrylonitrile.

Examples of ethylenically unsaturated monomers with a functional group other than the carboxylic acid group or the carboxylic anhydride group (iii) are hydroxyethyl(meth) acrylate, hydroxypropyl(meth)acrylate, isocyanatoethyl methacrylate, hydroxybutyl(meth)acrylate, propylene glycol monoacrylate, 2,3-dihydroxypropyl methacrylate, pentaerythritol monomethacrylate, polypropyleneglycol monoacrylates, and m-isopropenyl-a,a-dimethylbenzyl isocyanate.

Other examples of (iii) are maleic acid and fumaric acid dihydroxyalkyl esters in which the straight chained, branched or cyclic alkylgroup contains 2 to 20 carbon atoms. N-hydroxyalkyl(meth)acrylamides and N-hydroxyalkylfumaric acid mono- or di-amides may also be used, e.g., N-hydroxylethylacrylamide or N-(2-hydroxypropyl)-methacrylamide. Other hydroxyl group containing compounds include allylalcohol, monovinylethers of polyols, especially diols, such as monovinylethers of ethylene glycol and butanediol, and hydroxyl group containing allyl ethers or esters such as 2,3-dihydroxypropylmonoallylether, trimethylolpropane monoallylether or 2,3-dihydroxypropanoic acid allylester.

Copolymerization is carried out using conventional techniques such as heating the monomers in the presence of a polymerization initiating gent and optionally chain transfer agents. The copolymerization may be carried out in bulk or solution.

Suitable solvents for solution polymerization are ethylene glycol or propylene glycol and their derivatives, such as dipropylene glycol monomethyl ether and ethylene glycol monobutyl ether acetate; alcohols, such as butyl alcohol and diacetone alcohol; ketones, such as methyl propyl ketone and acetone; esters, such as butyl acetate and pentyl propionate; ethers, such as dioxane and tetrahydrofuran; and other compatible solvents, such as water and N-methyl pyrrolidone and mixtures thereof. One preferred mixture is ethylene glycol monobutyl ether and water.

Typical initiators are peroxides such as dialkylperoxides, peroxyesters, peroxydicarbonates, diacylperoxides, hydroperoxides, and peroxyketals and azo compounds such as 2,2'-azobix(2-methylbutanenitrile) and 1,1'-azobis (cyclohexanecarbonitrile).

Typical chain transfer agents are mercaptans such as octylmercaptan, n- or t-dodecylmercaptan; halogenated compounds; thiosalicylic acid, mercaptoacetic acid, mercaptoethanol, buten-1-01, and dimeric alpha-methylstyrene. Mercaptans are preferred.

The reaction is usually carried out at temperatures from about 20° C. to about 200° C. The reaction may conveniently be done at the temperature at which the solvent or solvent mixture refluxes, although with proper control a temperature below the reflux may be maintained.

The acid number of the polyacrylate is from about 5 to about 230 mg KOH/g, preferably from about 7 to about 156 mgKOH/g, most preferably from about 23 to about 227 mg KOH/g.

The polyacrylate has a weight average molecular weight of from about 4,000 to about 2,000,000, preferably from about 20,000 to about 400,000. The theoretical Tg of the polyacrylate is from about −30° C., to about 150° C., preferably from about 20° C. to about 75° C., and most preferably from about 30° C. to about 65° C.

The polyacrylate is partially or fully neutralized with ammonia and then diluted with deionized water under agitation to yield a finely divided dispersion. In another method, the polyacrylate is diluted in aqueous ammonia to yield a finely divided dispersion.

The aqueous anionic polyacrylate dispersion has a solid content from about 35% to about 65% by weight, preferably from about 40% to about 45% by weight.

Examples of commercially available polyacrylate dispersions are Synthemul 40-424 (Reichhold Chemicals Inc., Research Triangle Park N.C.), and Rhoplex WL-91 (Rohm & Haas Inc., Philadelphia, Pa.).

The composition according to the present invention is used in the form of emulsion and contains the components a), b), and c) in an aqueous emulsion having the total solids concentration of about 5 to 50 weight percent, preferably about 10 to 30 weight percent with a total solids concentration of about 10 to 20 weight percent being most preferred. The remaining material is generally water. At amounts much below 5 weight percent total solids a good coating is not provided without the application of numerous coatings. Whereas, at amounts much above 50 weight percent total solids the emulsion becomes too viscous to be easily applied. The aqueous emulsion composition according to the present invention also preferably contains an ionic surfactant, a leveling agent, and a wetting agent in amounts of about 0.1 up to about 2 weight percent of each.

The emulsion composition according to the present invention is preferably formed first as a coemulsion of oxidized polyolefin wax a) and paraffin wax b). This coemulsion is preferably in a coemulsion concentration of oxidized polyolefin wax a) to paraffin wax b) at about 1:3 to 3:1, with a coemulsion concentration of about 50:50 being most preferred. After the coemulsion is prepared then the acrylic copolymer emulsion c) is added to the coemulsion.

The process of protecting and applying the composition according to the present invention to a substrate comprises applying the composition comprising: a) about 10 to 50 weight percent of an oxidized polyolefin wax, b) about 10 to 80 weight percent paraffin wax, and c) about 10 to 80 weight percent acrylic copolymer based on dry material also containing about 70 to 90 weight percent water to a surface and allowing the composition to dry. The process according to the present invention is preferably conducted under ambient conditions and allowed to dry. In some instances, an additional coating is also applied. This application is generally conducted by spraying, wiping, painting, rolling, or brushing.

Although the present invention is generally used as a surface protection for substrates in the case of graffiti being applied thereto, this composition can also be used when temporary intentional coatings are applied and later removed. The substrate coated with the composition of the present invention then coated with the graffiti or other coating is removed by the application of hot water. The temperature of this water is preferably about 85° to 100° C. The hot water is applied to the surface and collected or disposed of in other means. The composition according to the present invention can easily be removed from substrates without the application of steam or high pressure. However, any method of removing this coating is applicable. However, the low pressure application of jet or spray of hot water is most advantageous to the present invention, not requiring special equipment for removal. The present invention also entails the substrate coated with the surface coating comprising a) about 10 to 50 weight percent of an oxidized polyolefin wax, b) about 10 to 80 weight percent paraffin wax, and c) about 10 to 80 weight percent acrylic copolymer based on dry material.

To provide the most preferred compositions of this invention and those illustrated in the examples the following steps are generally required:

1. Coemulsions of the oxidized polyethylene waxes with paraffin are prepared using an anionic surfactant system such as 2-amino-1-propanol with oleic acid. Typically 1/3 to 3/1 ratios of oxidized polyethylene/paraffin are used with target solids content of 10 to 40 percent, preferably 15 to 30 percent.

2. The acrylic polymers are prepared using standard polymerization techniques such as emulsion polymerization, solution polymerization, suspension polymerization and the like. Thermoplastic acrylic polymers such as Rhoplex WL-91 can be used.

The coemulsions of the oxidized polyethylene and paraffin and the acrylic polymer emulsions or dispersions are combined in the desired proportions plus the minor ingredients (leveling agents and wetting agents) such that when applied and dried on a substrate an effective removable anti-graffiti coating is obtained.

The application of the removable coating of this invention can be carried out using any suitable application technique including brushing, wiping, rolling, or spraying. The coating is allowed to dry which requires 10 to 30 minutes. After the coating is dry it can be subjected to graffiti without penetration through the coating to the underlying substrate.

The compositions and coatings of the present invention are illustrated by the following examples.

EXAMPLES

Example 1

A coemulsion of an oxidized polyethylene wax having an acid number of 16 and viscosity of 150 cP at 125° C. and density of 0.91 g/cc with a 130° F. (54° C.) paraffin at a 2/3 weight ratio was prepared by a wax to water method using 2-amino-1-propanol and oleic acid as the surfactant to a 20 percent solids by weight emulsion. This coemulsion having a pH of 10.0 was used as the base component in preparing the removable coating compositions.

The removable coating compositions were prepared by adding the following ingredients to a glass jar:

A. 35.7 ml of the above anionic emulsion of oxidized polyethylene and paraffin (20 percent solids)

B. 63.13 ml of water

C. 0.90 g FC-120 (fluorocarbon surfactant wetting agent)

D. 1.40 g KP-140 (tributoxy ethyl phosphate leveling agent)

E. 9.8 g Rhoplex WL-91 (thermoplastic acrylic emulsion) (41 percent solids)

The jar was capped and placed on a roller mill and allowed to mix overnight. The time for mixing can be varied depending on the nature and/or type of mixing equipment used.

This aqueous composition was applied to a ceramic tile using a polyurethane paint brush to provide a smooth coating. After drying in air for 30 minutes a second coating was applied. The coating was allowed to dry 24 hours. Spray paint was then applied representing a form of graffiti. The painted tile was then set outside for 1 and 2 weeks. It was observed that the coating and graffiti remained intact and were not removed by rain. This indicated the coating is water resistant. After 2 weeks the ceramic tile was subjected to steam (160 psig) to remove the sacrificial coating and graffiti.

The coating and graffiti were removed completely with no graffiti stain on the ceramic tile which showed that this sacrificial coating was effective in protecting the tile and was easily removed with steam requiring no chemicals. The amounts of the main components are a. 26 wt. % oxidized polyethylene wax, b. 38 wt. % paraffin wax and c. 36 wt. % acrylic copolymer, based on a total of the three.

Example 2

Similar experiments to Example 1 were carried out in which the acrylic emulsion (E) content was varied. At a lower level of 1 ml (5.4 weight percent based on a total of a, b, and c) the coating was removed by rain when exposed outside to the weather. At increasing levels of 20 and 30 ml (53 and 63 weight percents based on a total of a, b, and c) of acrylic emulsion, good adhesion with water resistance and ease of removal with steam were obtained. This shows the improved adhesion obtained with the acrylic emulsion but at a level providing ease of removal with steam or hot water.

Example 3

Similar experiments to Example 1 were carried out in which the acrylic emulsion content was varied from 0 to 29 percent based on the oxidized wax/paraffin content. Results are shown in Table I.

TABLE I

Effect of Acrylic Emulsion Content on Coating Properties

| Percent Acrylic (WL-91) | 0 | 1.0 | 10.0 | 29.0 |
|---|---|---|---|---|
| Acrylic Weight, g | 0 | 1.5 | 9.8 | 29.2 |
| Adhesion* | Poor | Poor | Good | Good |
| Weatherability** | Poor | Poor | Good | Good |
| Removability*** | — | — | Good | Good |

*Adhesion to ceramic tile
**Weatherability - coating remained intact after being subjected to outdoor weather, including rain (2 weeks with an average daily temperature of about 24° C. with 2 to 8 cm of rain).
***Removability - coating containing graffiti removed with steam (160 psig).

These data show that best results are obtained at acrylic emulsion contents 10 percent or greater. An effective removable anti-graffiti coating with good adhesion, weatherability and removability with steam is obtained. Poor results are obtained with one percent or less acrylic emulsion.

Example 4

This example illustrates the use of different acrylic emulsions at a 10 percent level using the same amounts of other ingredients given in Example 1. Also the use of 100 percent acrylic emulsion, Rhoplex WL-91, is shown in Table II. The results show that other acrylic emulsions are effective at the 10 percent level and that the best results are obtained with the Rhoplex WL-91 acrylic emulsion.

TABLE II

Effect of Different Acrylic Emulsions on Anti-Graffiti Coatings

| Acrylic Rohm & Haas | Percent Acrylic Em. | Adhesion | Weatherability | Removability |
|---|---|---|---|---|
| E-1614 | 10 | Good | Fair | Good |
| E-2133 | 10 | Good | Fair | Good |
| Acrysol 644 | 10 | Good | Fair | Good |
| Rhoplex WL-91 | 10 | Good | Good | Good |
| Rhoplex WL-91 | 100 | Good | Poor | — |

A coating of 1–2 mils (0.25 to 0.5 mm) was applied to a ceramic tile and allowed to dry followed by a second coat of 1–2 mils (0.25 to 0.5 mm) and aged at room temperature for 24 hours. Green spray paint was applied on the coating. The coated tile was placed outside for 1 week and subjected to rainy conditions. The coatings were examined for permanence and weatherability. Removal of the coatings was then carried out using steam (160 psig).

Results indicate the addition of acrylic emulsions to the formulation gave good adhesion to ceramic tile, had fair to good weatherability and good removability. The use of 100 percent acrylic emulsion showed good adhesion but poor weatherability or water resistance.

Rohm & Haas E1614=Styrenated acrylic copolymer containing acrylonitrile, zinc cross-linked. Molecular weight= 1M. Tg=52° C. Anionic emulsion.

Rohm & Haas E2133=Same as Rhoplex WL-91 but lower molecular weight. Molecular weight=<100,000. Tg=51° C. Anionic emulsion.

Rohm & Haas Acrysol 644=Alcohol soluble resin acrylic copolymer with high acid number. Molecular weight=35, 000. Anionic emulsion.

Rohm & Haas Rhoplex WL-91=Styrenated acrylic copolymer containing acrylonitrile. Molecular weight=1M. Tg=51° C. Anionic emulsion.

Example 5

This example shows the effect of using different oxidized polyethylenes and varying oxidized polyethylene wax/ paraffin ratios with an acrylic emulsion on anti-graffiti coating properties. The same procedures were used as given in Example 1 for making the oxidized polyethylene was/paraffin emulsion and for coating the ceramic tiles and test procedures.

TABLE III

Effect of Different Oxidized Polyethylene Wax/Paraffin Blends with Acrylic Emulsions on Coating Properties

| TX-1917- | 1 | 2 | 3 | 4 | 5 | 6 | 7 | 8 |
|---|---|---|---|---|---|---|---|---|
| Wax Composition | E-14/Paraffin 40/60 | | E-14/Paraffin 60/40 | | E-15/Paraffin 45/55 | | E-10/Paraffin 30/70 | |
| WL-91/Oxid. Wax Ratio | 0.08/1 | 0.56/1 | 0.08/1 | 0.56/1 | 0.08/1 | 0.56/1 | 0.08/1 | 0.56/1 |

TABLE III-continued

Effect of Different Oxidized Polyethylene Wax/Paraffin Blends with Acrylic Emulsions on Coating Properties

| TX-1917- | 1 | 2 | 3 | 4 | 5 | 6 | 7 | 8 |
|---|---|---|---|---|---|---|---|---|
| Property |  |  |  |  |  |  |  |  |
| Adhesion | Good | Good | Fair | Good | Good | Good | Good | Good |
| Water Resistance | Poor | Good | Poor | Fair | Poor | Fair | Poor | Good |
| Removability | — | Good | — | Good | — | Good | — | Good |

E-14 = Oxidized Polyethylene, Acid No. = 17, Viscosity = 225 cP @ 125° C., Density = 0.939
E-15 = Oxidized Polyethylene, Acid No. = 16, Viscosity = 350 cP @ 125° C., Density = 0.925
E-10 = Oxidized Polyethylene, Acid No. = 16, Viscosity = 800 cP @ 125° C., Density = 0.942
WL-91 = Rhoplex WL-91 acrylic emulsion Results show that oxidized polyethylene waxes of different viscosity and density can be used to provide effective coatings when used with an acrylic emulsion. It also shows that the acrylic emulsion content needs to be above the 5 weight percent.

I claim:

1. A coating composition comprising a) about 10 to 50 weight percent of an oxidized low molecular weight polyethylene wax having an acid number of 10 to 40, a Brookfield Thermosel viscosity of 50 to 2500 cP at 125° C., and a RBSP of 90° to 130° C., b) about 10 to 80 weight percent of a paraffin wax having a RBSP of 30° to 75° C., and c) about 10 to 80 weight percent of a thermoplastic acrylic copolymer containing 15 to 75 weight percent hard monomer, 20 to 70 weight percent soft monomer, and 0 to 30 weight percent acid monomer.

2. The composition according to claim 1 further comprising water such that the solids a), b), and c) are in an aqueous emulsion at total solids concentration of about 5 to 50 weight percent.

3. The composition according to claim 2, wherein the water is in a concentration of about 70 to 90 weight percent.

4. The composition according to claim 2 wherein said aqueous emulsion also contains minor amounts of an anionic surfactant, a leveling agent, and a wetting agent.

5. A process of protecting a structure by applying an antigraffitic coating to the surface of a structure comprising applying the composition of claim 2 to said surface and drying said composition to remove water.

6. The process according to claim 5 wherein the drying is conducted at ambient conditions.

7. The process according to claim 5 wherein after said drying a second coating is applied to said surface and dried.

8. The process according to claim 5 further comprising removing the coating by applying hot water to the coated surface at a temperature greater than 80° C.

9. The process according to claim 8 wherein said hot water is a temperature of about 850° to 100° C.

10. The process according to claim 8 wherein said hot water is in the form of steam.

11. An article of manufacture comprising a structure with a surface coating comprising the coating composition of claim 1.

12. The article of claim 11 wherein said structure has an exposed surface.

* * * * *

UNITED STATES PATENT AND TRADEMARK OFFICE
CERTIFICATE OF CORRECTION

PATENT NO. : 5,750,269
DATED : May 12, 1998
INVENTOR(S) : Vernon Kee Park

It is certified that error appears in the above-indentified patent and that said Letters Patent is hereby corrected as shown below:

Claim 9, Column 10, Line 31, should read -- 85° to 100° C. --

Signed and Sealed this

Eleventh Day of August 1998

Attest:

BRUCE LEHMAN

Attesting Officer

Commissioner of Patents and Trademarks